US012770894B2

(12) United States Patent
Teuku et al.

(10) Patent No.: US 12,770,894 B2
(45) Date of Patent: Oct. 20, 2026

(54) FLOW-FIELD PLATE FOR POLYMER ELECTROLYTE MEMBRANE DEVICE

(71) Applicants: PETROLIAM NASIONAL BERHAD (PETRONAS), Kuala Lumpur (MY); Universiti Kebangsaan Malaysia, Selangor (MY)

(72) Inventors: Husaini Teuku, Selangor (MY); Mohd Shahbudin Mastar @ Masdar, Selangor (MY); Geetha Srinivasan, Belfast (GB); Safwan Hanis Bin Mohd Murad, Kajang (MY); Colin Patrick, Kuala Lumpur (MY); Siti Sara Lyana Binti Badly Sham, Cheras (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 670 days.

(21) Appl. No.: 18/039,399

(22) PCT Filed: Nov. 18, 2021

(86) PCT No.: PCT/MY2021/050104

§ 371 (c)(1),
(2) Date: May 30, 2023

(87) PCT Pub. No.: WO2022/114947

PCT Pub. Date: Jun. 2, 2022

(65) Prior Publication Data

US 2024/0006625 A1 Jan. 4, 2024

(30) Foreign Application Priority Data

Nov. 30, 2020 (MY) ............................ PI2020006324

(51) Int. Cl.
*H01M 8/0258* (2016.01)
*C25B 9/60* (2021.01)
*H01M 8/10* (2016.01)

(52) U.S. Cl.
CPC ............. *H01M 8/0258* (2013.01); *C25B 9/60* (2021.01); *H01M 8/10* (2013.01); *H01M 2008/1095* (2013.01)

(58) Field of Classification Search
None
See application file for complete search history.

(56) References Cited

U.S. PATENT DOCUMENTS 10,522,850 B2 12/2019 Gould et al.
11,749,812 B2 * 9/2023 Kapitza ............... H01M 8/0258 429/514

(Continued)

FOREIGN PATENT DOCUMENTS

DE 102018209441 A1 * 12/2019 .......... H01M 8/0258
EP 2348567 B1 11/2013

(Continued)

OTHER PUBLICATIONS

DE-102018209441-A1 Abstract Translation (Year: 2018).*

(Continued)

*Primary Examiner* — Kevin M Bernatz
(74) *Attorney, Agent, or Firm* — Harness, Dickey & Pierce. P.L.C.

(57) ABSTRACT

A flow-field plate (101) for a polymer electrolyte membrane device such as an electrolyser or a fuel cell comprising an inlet on one side (102) of the plate and 5 an outlet (103) on the opposite side, a distribution array (110) including a plurality of linear channels (106), a first interface (104) between the inlet (102) and distribution array (110) and a second interface (105) between the distribution array (110)

(Continued)

and the outlet (103), wherein each interface includes up to $r_n$ rows of baffles (107), where $r_n$=the width of the interface $h_d$ divided by the baffle diameter $h_b$, the majority of the baffles in each row being set at a particular angle relative to the longitudinal axis of the linear channels (106).

10 Claims, 7 Drawing Sheets

(56) References Cited

U.S. PATENT DOCUMENTS

| | | | | |
|---|---|---|---|---|
| 2004/0142223 | A1* | 7/2004 | Allen | H01M 8/0228 429/470 |
| 2009/0098432 | A1* | 4/2009 | Rosenberg | H01M 8/2459 429/400 |
| 2010/0151359 | A1* | 6/2010 | Tanaka | H01M 8/0204 429/514 |
| 2010/0221633 | A1* | 9/2010 | Fujita | H01M 8/0265 429/452 |
| 2010/0248085 | A1* | 9/2010 | Chang | H01M 8/04089 429/523 |
| 2011/0076596 | A1* | 3/2011 | Futami | H01M 8/0245 83/13 |
| 2020/0119380 | A1* | 4/2020 | Noda | H01M 8/124 |

FOREIGN PATENT DOCUMENTS

| | | | |
|---|---|---|---|
| EP | 3018744 | A1 | 5/2016 |
| JP | 2010153158 | A | 7/2010 |
| JP | 2014186858 | A | 10/2014 |
| WO | WO-2020203897 | A1 | 10/2020 |

OTHER PUBLICATIONS

International Search Report and Written Opinion of the International Searching Authority, issued in PCT/MY2021/050104, mailed Feb. 24, 2022; ISA/AU.

* cited by examiner

FLOW-FIELD PLATE FOR POLYMER ELECTROLYTE MEMBRANE DEVICE

CROSS REFERENCE TO RELATED APPLICATIONS

This application is a U.S. National Phase Application under 35 U.S.C. 371 of International Application No. PCT/MY2021/050104 filed on Nov. 18, 2021, which claims the benefit of priority from Malaysian Patent Application No. PI2020006324. filed Nov. 30, 2020. The entire disclosures of both of the above applications are incorporated herein by reference.

FIELD OF THE INVENTION

The invention relates to a flow-field plate for a polymer electrolyte membrane device such as an electrolyser or a fuel cell.

BACKGROUND

Hydrogen as a clean energy carrier has zero or low carbon emission depending on the method of its production and the primary fuel or source used to produce it. Hydrogen offers a very viable means to store energy from resources such as solar energy, hydro power, organic wastewater and water while reducing the carbon footprint.

A flow-field plate such as a bipolar plate is a key component in polymer electrolyte membrane electrolysers and fuel cells. Polymer electrolyte membrane electrolysers include Proton Exchange Membrane (PEM) electrolysers and Anion Exchange Membrane (AEM) electrolysers. An electrolyser functions to convert water into hydrogen and oxygen using electrical energy, whereas a PEM fuel cell has the reverse function and workings, converting chemical energy stored in hydrogen fuel directly and efficiently to electrical energy with water as the only by-product. The bipolar plate distributes reactants to the electrode, also known as the active area. It is important for the reactants to be distributed evenly to obtain the best performance in terms of both contact and flow distribution. Hence, in order to achieve such performance, the design and development of bipolar plates is important.

It should be noted that a bipolar plate is a plate with flow fields on both sides, providing separation between cells, and allowing them to be stacked.

Linear flow bipolar plates are a recognised design in the field of fluid dynamics and are excellent in terms of ease of flow distribution as well as low pressure drop. However, it is typically difficult to be able to supply fluid directly to all flow channels on a wide plate, because this requires a wide inlet opening. A wide inlet opening has the potential for leakage and requires a large initial distribution space and this is difficult to fabricate with traditional plate designs.

It is also known for fuel cells to use bipolar plates with a serpentine flow design, as for example described in U.S. Ser. No. 10/522,850, where a three-dimensional printed bipolar plate is designed to comprise at least one continuous flow path including a serpentine channel with a trapezoidal cross-sectional shape. The bipolar plate includes a main body with a first end and a second end spaced from the first end along a longitudinal axis of the main body. There is at least one inlet and outlet located at the respective end of the main body with mixing tabs thereat and along the flow path. The serpentine channel design is an improved up-scaling feature to increase both contact and flow distribution.

However, one of the problems with this serpentine flow channel design is that there are still occurrences of fluid accumulation, also known as hotspot areas. These hotspot areas lead to poor performance as they affect the electrolysis process. Hence, it is important that the bipolar plate comprises a channel design that optimizes the contact area and distribution of reactants in order to obtain good conversion and efficiency.

As demand for clean Hydrogen gas in large quantities increases, large-scale and high-pressure electrolysers are needed. High pressure hydrogen electrolysers can save storage space and will also facilitate transportation. However, large PEM/AEM electrolyser cells are associated with the problem of performance degradation, especially during operation at high pressure. Therefore, design and development of the plates is crucial.

The aim of the invention is to provide a plate which overcomes at least some of the above issues.

SUMMARY OF INVENTION

In an aspect of the invention there is provided a flow-field plate for a polymer electrolyte membrane device comprising:

- an inlet on one side of the plate and an outlet on the opposite side;
- a distribution array including a plurality of linear channels;
- a first interface between the inlet and distribution array and a second interface between the distribution array and the outlet;
- characterized in that each interface includes up to $r_n$ rows of baffles, where $r_n$=the width of the interface $h_d$ divided by the baffle diameter $h_b$, the majority of the baffles in each row being set at a particular angle relative to the longitudinal axis of the linear channels.

Advantageously the baffles distribute the fluid more evenly than an interface with no baffles, thereby reducing the areas of slow or uneven flow across the channels i.e. hotspots.

In one embodiment there are three rows of baffles. Typically, the baffles comprise a plurality of columns, each column having at least one substantially flat surface and positioned such that the or each flat surface defines an angle relative to the longitudinal axis of the linear channels.

In one embodiment the number of baffles per row is estimated based on the length of the row divided by the diameter of the baffles $h_b$ plus a minimum distance of 1 mm. Typically the minimum distance ranges between about 1 mm and about 10 mm.

In one embodiment the baffles comprise a plurality of columns which are semi-circular in cross-section. Typically, the baffles comprise one or more central columns which are quarter-circle in cross-section. It will be appreciated that other geometric shapes with flat surfaces contacting the flow could be used.

Advantageously the semi-circular baffles improve the fluid distribution further, particularly in large plates with a surface active area of 400 $cm^2$ or more.

In one embodiment the baffles comprise a plurality of columns which are oval or lens-shaped in cross-section.

Advantageously the oval or lens-shaped baffles improve the fluid distribution further, particularly in small or medium plates with a surface active area of 400 $cm^2$ or less.

In one embodiment the angle of the majority of the baffles in one row is different to the angle of the majority of the baffles in at least one other row. Alternatively, the angle is the same for each row.

In one embodiment the diametric axes of the majority of the baffles are angled at around 40-60°, 50-70°, and 50-90° relative to the longitudinal axis of the linear channels in respective first, second and third rows.

Advantageously it has been found that rows of baffles at different angles for at least one of the rows perform better than when the angle of the baffles in each row is the same.

Typically, the diametric axes of the majority of the baffles are angled at around 50°, and 60° relative to the longitudinal axis of the linear channels in respective first, second and third rows.

In one embodiment the baffles near the ends of a row have a higher angle relative to the longitudinal axis of the linear channels compared to the baffles in the rest of that row.

In one embodiment the angle of the baffles in each row increases by around 1-20°, typically about 5-10°, for each respective row.

In one embodiment each interface includes at least one row of support columns which are circular in cross-section. Typically, the support columns are located between the baffles and the channels.

As a rule, there should be no empty space of more than 78 $mm^2$ for a plate using stainless steel (SS316) or material of equivalent strength, with a minimum thickness of 0.5 mm, to prevent buckling under pressure.

In one embodiment the shape of each channel is trapezoidal in cross-section. Advantageously this provides a large upper surface area for improved contact (electrical conductivity) and a wide channel for fluid flow.

In one embodiment the plate is bipolar. This provides channels on both sides of the plate, and allows multiple plates to be stacked to form a zero-gap unit. Thus, the plates at either end of the stack are monopolar, whereas those sandwiched in between are bipolar.

In one embodiment each interface is 3D-printed. It should be appreciated that accurate manufacture of the interfaces is difficult with normal CNC machine technology.

In a further aspect there is provided a polymer electrolyte membrane fuel cell or electrolyser comprising one or more flow-field plates (101) as described herein.

Thus, it should be appreciated that the plates described herein, whether bipolar or otherwise, may be used or adapted for use in hydrogen fuel cells as well as PEM/AEM electrolysers.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

Hydrogen is a clean energy carrier which can be used as fuel for power generation to cover stationary and mobile applications and also as feed stock for value added chemical production. Hydrogen can be produced from various resources including fossil fuels, biomass, and water electrolysis with electricity. One of the best methods to obtain clean Hydrogen is by using water electrolysis using polymer electrolyte membrane electrolyser technology.

A PEM electrolyser is an electrolysis device that can split water into Hydrogen and Oxygen molecules with the aid of a bipolar plate as one of its components. They are bipolar because they have reactant flow channels on one side and products on the other, forming the anode and cathode compartments of the unit cells on the opposing sides of the plate. This allows multiple electrolysis cells to be stacked together to achieve a zero-gap electrolyser unit.

Similarly, a bipolar plate constitutes the backbone of a PEM fuel cell stack as it facilitates water and thermal management through the cell, and provides conduits for reactant gases as well as removing reaction products. The fuel cell stack converts the chemical energy stored in hydrogen fuel directly and efficiently to electrical energy with water as the only by-product.

In both cases, performance can be improved through optimization of this electrochemical reaction and the continuous supply of an adequate fluid source.

To attain high performance, the bipolar plate design should have a large surface area for the electrolysis process to occur. To concurrently supply reactants and retrieve products effectively, the design must provide the space for the reactant path and the product path without compromising one another.

A conventional bipolar plate design tends to experience problems in optimizing the contact area of the electrodes with respect to the flow of fluid which affects the production efficiency. For example, if the surface area is enlarged then the channel area will shrink and vice versa. According to the present invention, a trapezoidal (triangular) flow field design of the bipolar plate aids in optimizing the contact area of the flow channel of reactant/product, but without significantly affecting the surface area.

The current invention comprises a flow-field plate in the form of a bipolar plate with a linear flow design that produces the best performance in terms of both contact and flow distribution. With the said flow field design, the surface area is optimised and the distribution of reactant is more even, which increases the efficiency of the flow for the electrochemical reaction to occur compared to a conventional flow field bipolar plate.

Figure 1A:
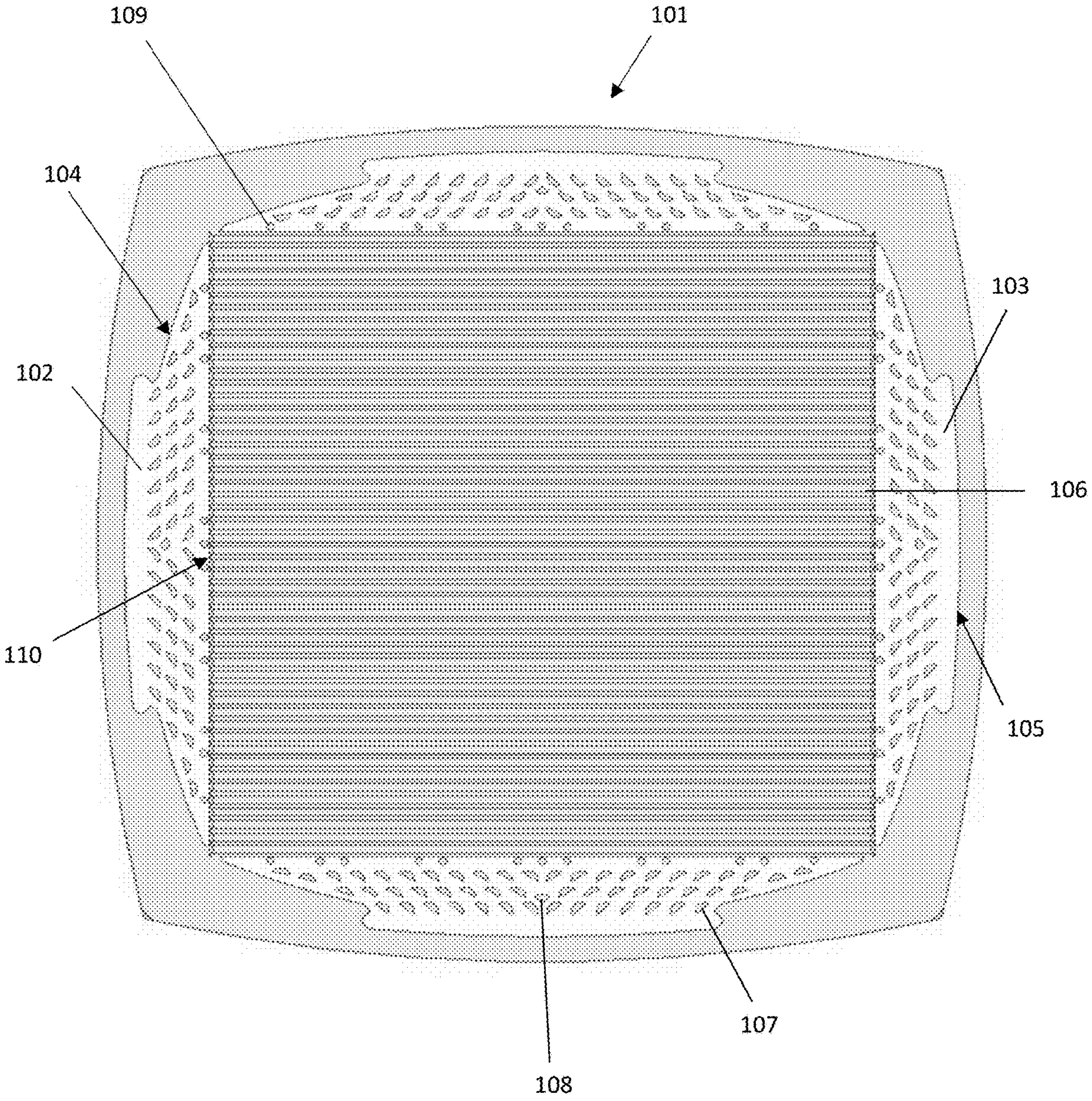
FIG. 1 illustrates a linear flow bipolar plate design according to an embodiment of the invention (a) cutaway view in two dimensions; (b) cutaway view in three dimensions; (c) schematic view of interface; (d) closeup partial schematic view of interface.
Figure 1B:
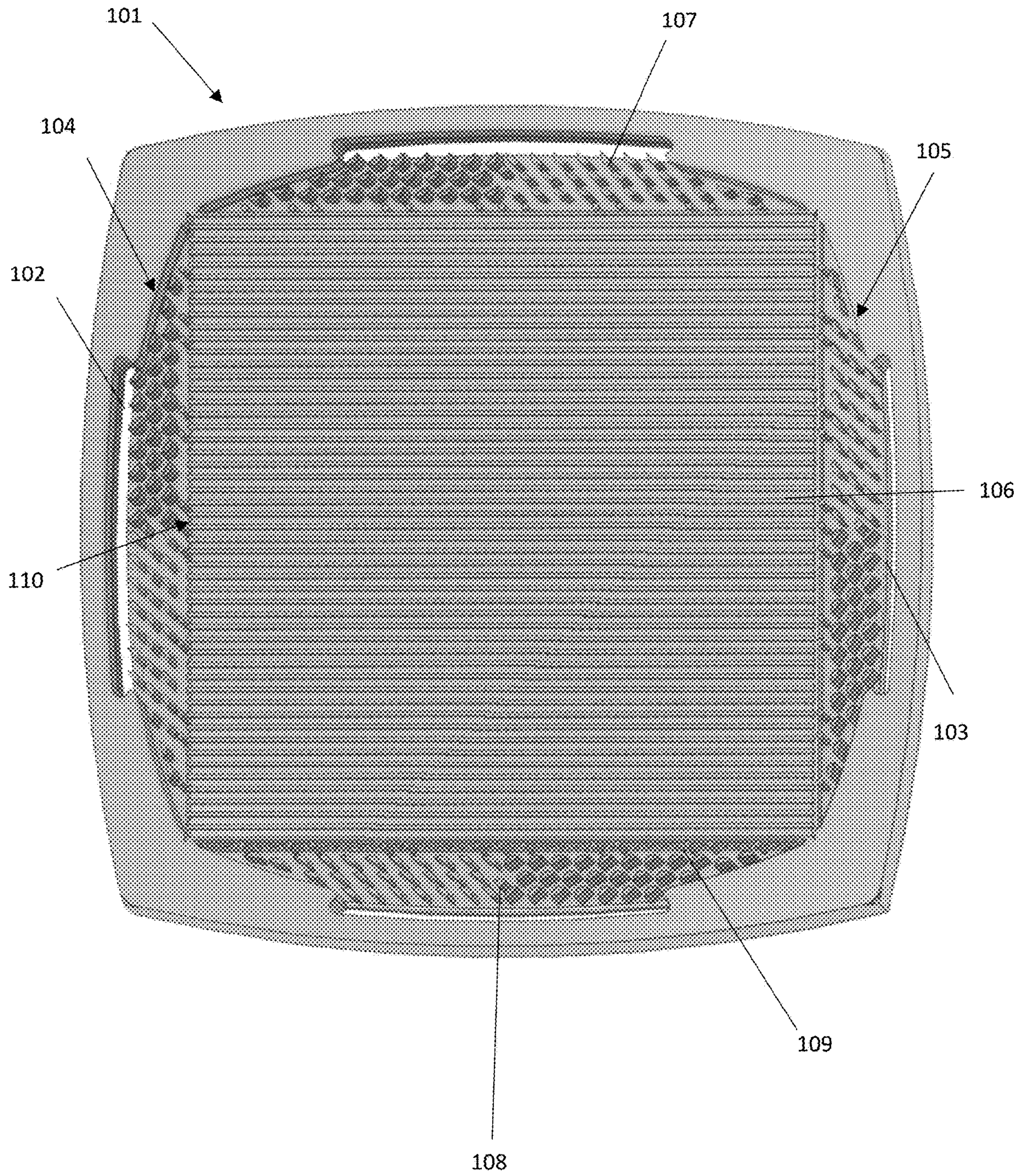

FIGS. 1A and 1B shows a linear flow channel bipolar plate (101) used to prevent large water accumulation or hotspots area and to ensure the reactant is flowing evenly in all active areas of an array (110) of linear flow channels (106) with the assistance of two flow interfaces. In this example the flow interfaces (104, 105) in the bipolar plate (101) are three-dimensionally printed and include a number of different types of baffles together with support columns to improve the efficiency of the flow and distribute it evenly. This increases the production of Hydrogen when the bipolar plate is used for water electrolysis.

The first interface (104) is located between the inlet (102) and distribution array (110) and the second interface (105) is located between the distribution array (110) and outlet (103). The first interface (104) allows the fluid to be supplied to the active area directly and thus more effectively, as all the channels (106) in the array (110) are directly connected to the main inlet (102).

The number of baffles is determined by the size of the array and the channels. In this example, each flow interface (104, 105) comprises at least three rows of baffles and at least one row of support columns (109). The rows are arranged perpendicular to the flow through the channels (i.e. the longitudinal axis of the channels).

There are two types of baffle in each flow interface (104, 105), each of which is in the form of a column extending between the lower and upper internal surfaces of the interface. In this example the main baffles (107) are semi-circular in cross-section and have a cross-sectional area of around 6.947 $mm^2$ (corresponding to a radius of around 2.103 mm). A centre baffle (108) is a quarter-circle in cross-section and has a cross-sectional area of around 6.527 $mm^2$ (corresponding to a radius of around 2.883 mm).

The support columns (109) are circular in cross-section and are located between the baffles and the flow channels. In this example they have a cross-sectional area of around 3.976 $mm^2$ (corresponding to a radius of around 1.125 mm).

In the example illustrated the area of the interface is 2562.633 $mm^2$, and there are 52 semi-circular baffles, 1 centre baffle, and 13 support columns comprising an area of 415.483 $mm^2$, around 16.2% of the interface area, which is well below the acceptance threshold of 50%.

Figure 1C:
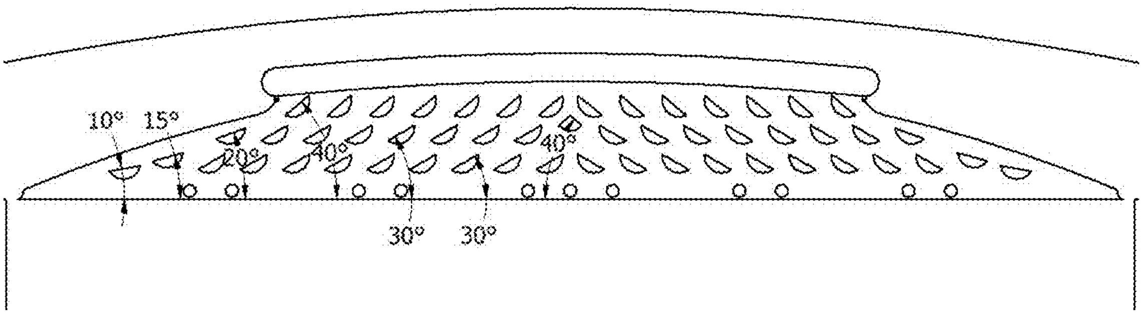

With further reference to FIG. 1C it can be seen that most of the baffles (107) in each row are positioned such that the diametric axis of the baffles is at a particular angle relative to the longitudinal axis of the linear channels, and this angle varies between rows. In other words, the flat faces of the baffles are directed towards the incoming flow.

In this example the diametric axis of the baffles in the first row is angled at around 40° to the row axis (50° to the longitudinal axis of the linear channels), which decreases to around 30° (i.e. increases to 60° to the longitudinal axis of the linear channels) in the second third rows.

It will be appreciated that the baffles at the ends of the rows tend to face more toward the incoming fluid to improve flow at the edges of the interface. Thus in this example the end baffles in the second row are angled at around 20° to the row axis (70° to the longitudinal axis of the linear channels), the penultimate baffles in the third row are angled at around 15° to the row axis (75° to the longitudinal axis of the linear channels), and the end baffles in the third row are angled at around 10° to the row axis (80° to the longitudinal axis of the linear channels).

In addition, it should be noted that the baffles on one side of the interface are at the same angle but face the opposite direction compared to the baffles on the other side of the interface, in order to guide the fluid to the respective sides. The central baffle may be angled with its diametric axis at 90° to the longitudinal axis of the linear channels, so that its flat surfaces face the incoming flow substantially equally.

The size of the baffles (107, 108) and support columns (109) in the flow interface are constant, irrespective of the size of the interface.

Figure 1D:
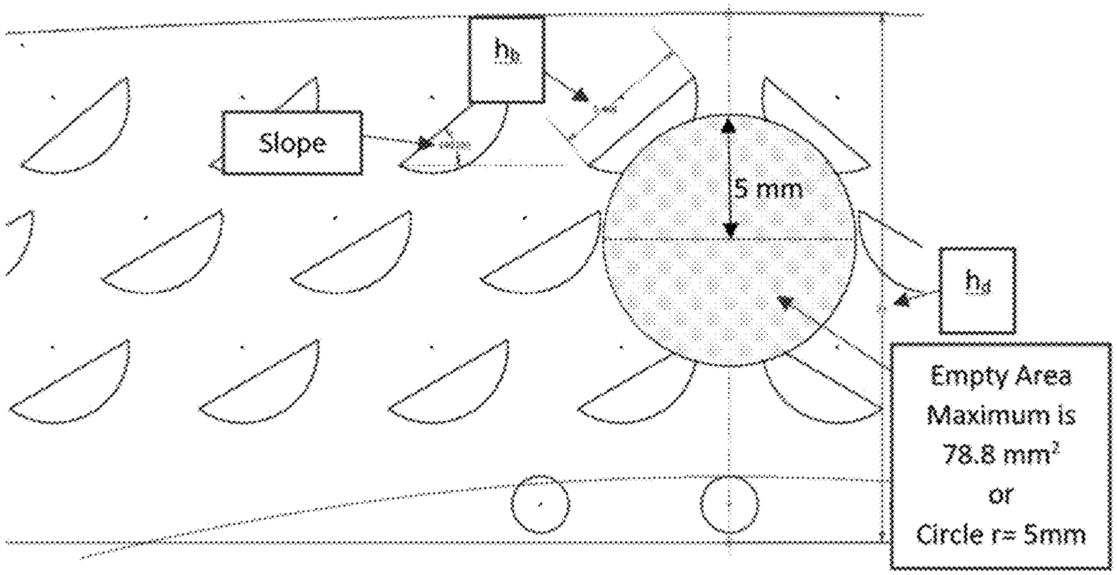

With respect to FIG. 1*d*, it can be seen that there is no empty space without a support which is over 78 $mm^2$ (i.e. circle with radius 5 mm) for stainless steel (SS316) material or equivalent material with a minimum thickness of 0.5 mm. The distance of this empty space depends on the strength of the material used and the thickness of empty space, for weaker materials the distance of the empty space must be even closer. This defines the number of baffles and support columns required.

The minimum number of baffles is Area 'A' (direct channel hole i.e. the interface area) divided by the maximum empty area, so in this example:

$$\text{Minimum number of baffles} = 2562.633\ mm^2/78.8\ mm^2 = 35.5\ \text{baffles}$$

The maximum number of baffles is 50% of area of direct channel hole i.e. the interface area divided by area of a baffle, so in this example:

$$\text{Maximum number baffles} = (2562.633\ mm^2/6.947\ mm^2)/2 = 184\ \text{baffles}$$

The maximum number of rows is estimated based on the width of the interface ($h_d$=21 mm) divided by the baffle diameter ($h_b$=5.469 mm), so in this case:

$$\text{number of rows} = 21/5.469 = 3.8\ \text{rows maximum.}$$

Therefore, the number of rows is 3, the excess of 0.8 rows being added using circular supports.

The maximum number of columns (baffles) per row is estimated based on the length of row (different in each row) divided by the diameter of the baffles ($h_b$=5.469 mm) and add 1 mm (space minimum), so in this example: Maximum number of columns/row=138/(5.469+1)=21.

In this example the surface active area of the plate is more than 400 $cm^2$ with the advantage that the shape, location and angle of the baffles is designed in such a way so as to spread out the flow and reduce the pressure drop for a substantially even distribution from the inlet (102) channel to the outlet (103) channel. The combination of the interfaces (104, 105) together with the linear flow bipolar plate design minimizes the hotspots area in comparison to a serpentine flow design.

The optimum arrangement of baffles was determined through repeated simulations, until the distribution of low velocity flow was lower than 10%.

It should be appreciated that accurate manufacture of the plate was made possible by 3D-printing technology, although it will be appreciated that other methods of manufacture may be viable.

Figure 4A:
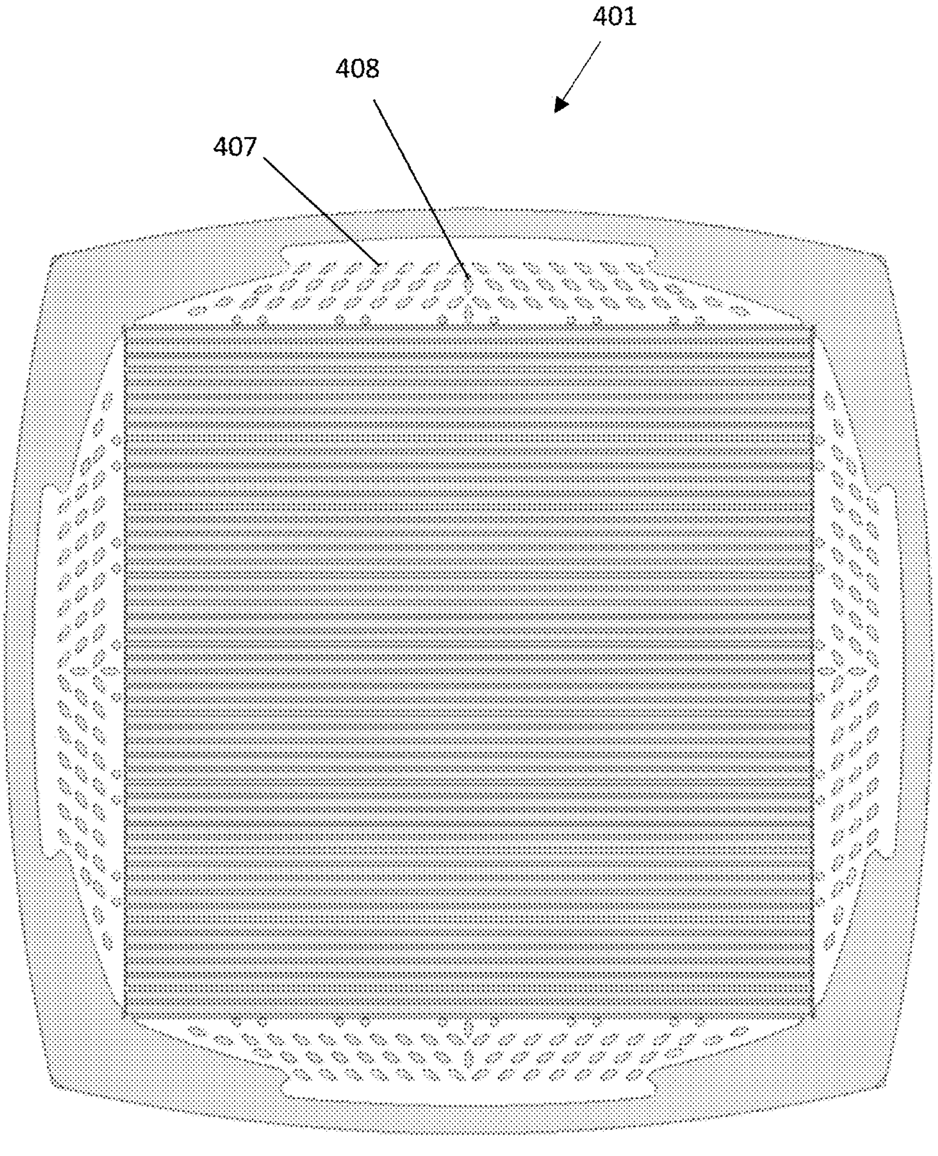
FIG. 4 illustrates a linear flow bipolar plate design according to a further embodiment of the invention (a) a cutaway view in two dimensions; (b) a partial three-dimensional view.
Figure 4B:
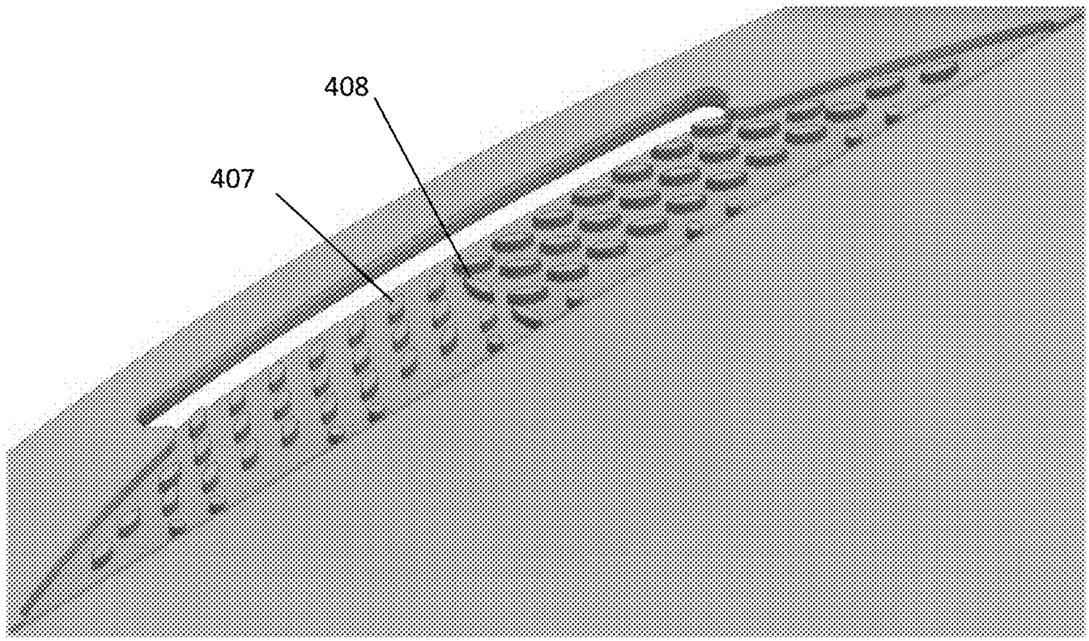

With reference to FIGS. 4*a-b*, a bipolar plate with a medium size plate (401) having a surface active area of less than 400 $cm^2$ may comprise a different type of baffle in comparison to a larger plate design, namely a smooth baffle (407, 408) which is oval or lens shape in cross-section, and have a cross-sectional area of around 7.081 $mm^2$.

In this example there are 54 smooth baffles and 10 support columns in each interface comprising an area of 422.134 $mm^2$, around 16.5% of the interface area, which again is well below the acceptance threshold of 50%.

Figure 2:
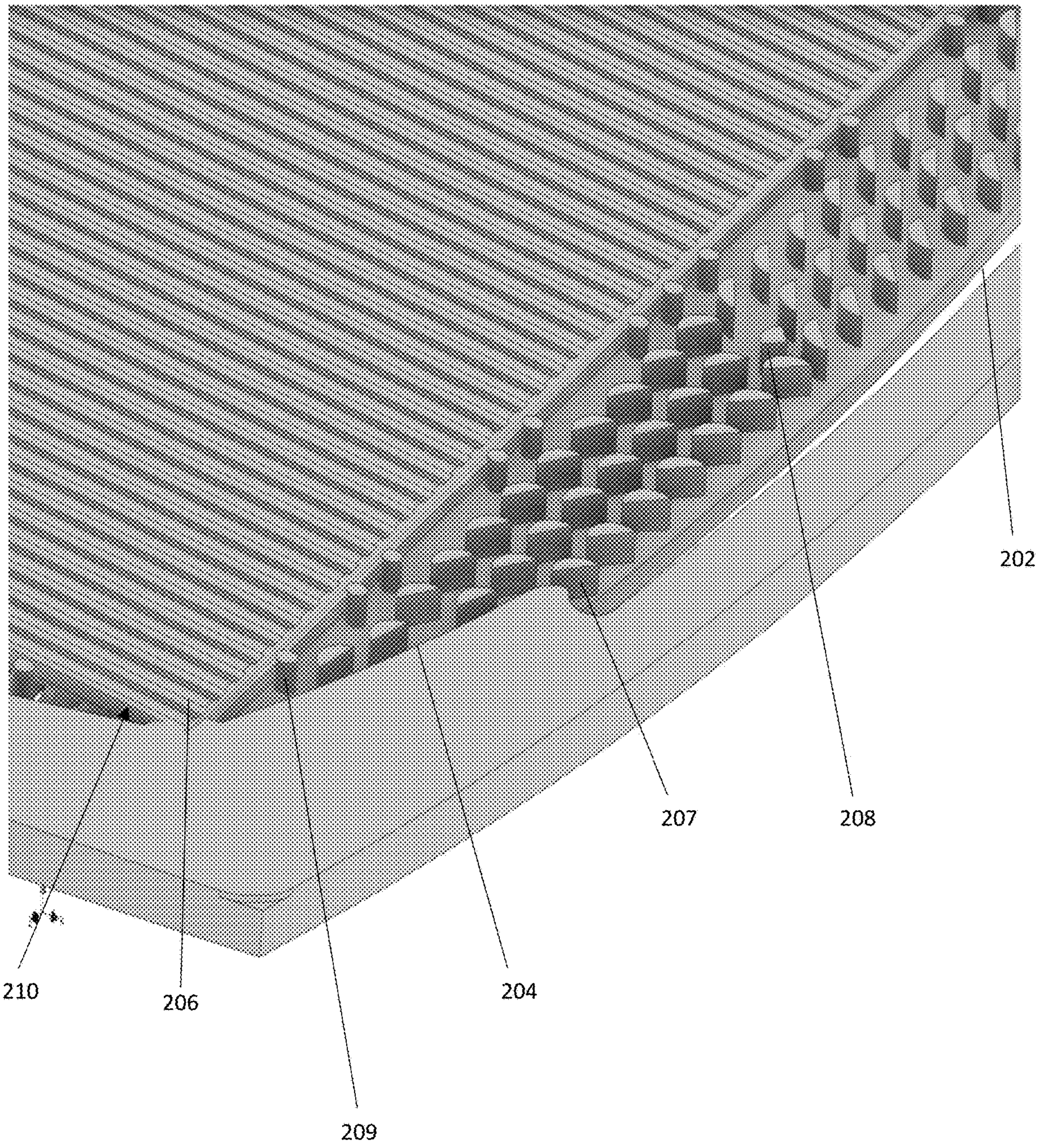
FIG. 2 illustrates a partial three-dimensional cutaway view of a linear flow bipolar plate design according to an embodiment of the invention.

FIG. 2 shows a cutaway three-dimensional view of the flow interface. The reactants move from the inlet (201) to the flow field channels (206) in the distribution array (210) at a certain velocity.

The pressure between the inlet and outlet varies primarily due to the friction that the fluid encounters with the channel walls. The difference in pressure between the inlet and outlet of the channel affects the fluid flow. The flow through the channels can be laminar or turbulent. When the pressure drop increases at the inlet, as in prior art designs, this can cause a significant difference in pressure along different points of the flow field channel.

The reactants flow from the inlet via the three rows of baffles (207, 208) and support columns (209) to the channels (206) of the distribution array where they are distributed evenly due to the reduced pressure drop. The baffles (207, 208) and support columns (209) increase the efficiency of the flow and distribute it evenly in comparison to a serpentine flow design. The reactant in the flow field channel (206) flows linearly towards the second interface located between the distribution array and outlet (not shown).

A bipolar plate with no baffles has a low velocity distribution area of 2.25% (where low velocity is below 0.00033335 m/s, i.e. almost stationary flow). However, the low velocity distribution area decreases to 0.046% (i.e. a reduction of around 98%) with the inclusion of semicircle cross-section baffles (204) as described herein. Similarly, with smooth baffles, the low velocity distribution area is 0.023% i.e. a reduction of around 99% compared to a bipolar plate with no baffles.

Figure 3:
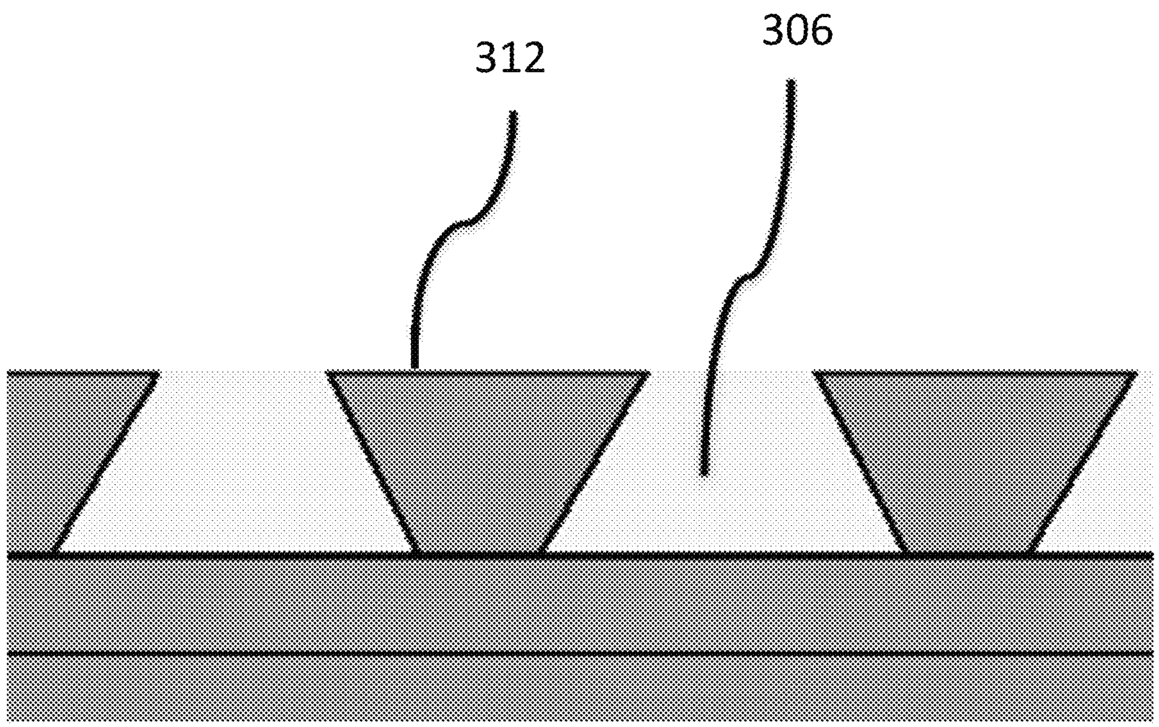
FIG. 3 illustrates a partial schematic cross-sectional view of a linear flow bipolar plate design according to an embodiment of the invention.

FIG. 3 shows a cross-section through several channels (306). The flow field design is designed to be larger on the upper surface (312) and narrows down the channel in order to increase the size of the contact area together with the fluid flow space in the fluid flow channel (306). In order to fill in the fluid to all flow channels (306) directly from the inlet (102), the said inlet (102) tends to need a larger opening which will result in increasing the width of the bipolar plate. However, a smaller opening is preferred over the wider opening in order to maintain smaller plate width with more even fluid distribution. The efficiency of the smaller opening could be overcome with the aid of baffles (107, 108) in the flow interface to improve the efficiency of the flow and evenly distribute the fluid in the flow channels (306). Apart from that, the baffles (107, 108) also act as a support for the empty holes in the direct channel to preclude the plate from curving due to pressure. In other words, the flow interface (104, 105) section controls the dynamics of the flow.

The preferred three-dimensional flow field of channel shape is a trapezoidal cross-section shape; although any other suitable cross-sectional shapes would also be acceptable. A trapezoidal cross-section shape is preferable as it has both a wide surface area (312) for contact and wide channel (306) for fluid flow. The dimensions of the trapezium could be modified and optimized to improve the surface area contact by following the law of a flow field bipolar plate design. Typically, the distance between the upper surfaces of adjacent trapeziums should be 1 mm to 2 mm.

It will be appreciated by persons skilled in the art that the present invention may also include further additional modifications which does not affect the overall functioning of the system.

The invention claimed is:

1. A flow-field plate (101) for a polymer electrolyte membrane device comprising:

an inlet on one side (102) of the plate and an outlet (103) on the opposite side;

a distribution array (110) including a plurality of linear channels (106);

a first interface (104) between the inlet (102) and distribution array (110) and a second interface (105) between the distribution array (110) and the outlet (103);

each interface includes at least three up to $r_n$ rows of baffles (107), where $r_n$=the width of the interface $h_d$ divided by the baffle diameter $h_b$, the majority of the baffles in each row being set with diametric axes at a particular angle relative to the longitudinal axis of the linear channels (106) so that at least one surface of the baffles faces the incoming fluid flow and directs it to the plurality of linear channels (106), each of the linear channels (106) having a trapezoidal cross-section;

characterised in that the baffles comprise a plurality of columns which are semi-circular in cross-section, each having a substantially flat surface which defines its diametric axis and faces the incoming fluid flow;

wherein the angle of the majority of the baffles in one row is different to the angle of the majority of the baffles in at least one other row; and the diametric axes of the majority of the baffles are angled at around 40-60°, 50-70° and 50-90° relative to the longitudinal axis of the linear channels in respective first, second and third rows.

2. The flow-field plate (101) according to claim 1, wherein the number of baffles per row is estimated based on the length of the row divided by the diameter of the baffles $h_b$ plus a minimum distance of 1 mm.

3. The flow-field plate (101) according to claim 1, wherein the baffles comprise one or more central columns which are quarter-circle in cross-section.

4. The flow-field plate (101) according to claim 1, wherein the diametric axes of the majority of the baffles are angled at around 50°, 60° and 60° relative to the longitudinal axis of the linear channels in respective first, second and third rows.

5. The flow-field plate (101) according to claim 1, wherein the baffles near the ends of a row have a higher angle relative to the longitudinal axis of the linear channels compared to the baffles in the rest of that row.

6. The flow-field plate (101) according to claim 1, wherein each interface (105) includes at least one row of support (109) columns which are circular in cross-section.

7. The flow-field plate (101) according to claim 1, wherein the shortest distance between adjacent linear channels (106) having trapezoidal cross-section is 1 mm to 2 mm.

8. The flow-field plate (101) according to claim 1, wherein the plate is bipolar.

9. The flow-field plate (101) according to claim 1 wherein each interface is 3D-printed.

10. A polymer electrolyte membrane fuel cell or electrolyser comprising one or more flow-field plates (101) according to claim 1.

* * * * *